United States Patent
Ishikawa et al.

(10) Patent No.: US 8,215,090 B2
(45) Date of Patent: Jul. 10, 2012

(54) WALK BEHIND WORK MACHINE HAVING AN ENGINE MOUNTING STRUCTURE

(75) Inventors: Tomoaki Ishikawa, Wako (JP); Mai Ohba, Wako (JP); Shuhei Maruyama, Wako (JP); Jitsumi Hanafusa, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/049,228

(22) Filed: Mar. 16, 2011

(65) Prior Publication Data
US 2011/0239608 A1 Oct. 6, 2011

(30) Foreign Application Priority Data

Mar. 30, 2010 (JP) ................. 2010-078807

(51) Int. Cl.
*A01D 34/00* (2006.01)
(52) U.S. Cl. .................. 56/16.7; 248/637; 248/638
(58) Field of Classification Search .............. 248/638, 248/611, 637, 604, 624, 621; 180/299, 232, 180/291, 300, 312, 53.1; 56/11.9, 16.7
See application file for complete search history.

(56) References Cited

U.S. PATENT DOCUMENTS

| | | | | |
|---|---|---|---|---|
| 1,729,394 A * | 9/1929 | Lee | ................ | 248/621 |
| 3,105,717 A * | 10/1963 | Schilberg | ................ | 296/35.1 |
| 3,429,533 A * | 2/1969 | Harkness | ................ | 248/637 |
| 3,545,706 A * | 12/1970 | Harshman | ................ | 248/604 |
| 3,841,425 A * | 10/1974 | Harkness | ................ | 180/53.1 |
| 3,970,272 A * | 7/1976 | Kaesgen | ................ | 248/611 |
| 4,316,355 A * | 2/1982 | Hoff | ................ | 56/11.3 |
| 4,422,283 A * | 12/1983 | Scanland | ................ | 56/320.2 |
| 4,676,205 A * | 6/1987 | Kaufman | ................ | 123/195 R |
| 4,711,077 A * | 12/1987 | Kutsukake et al. | ................ | 56/320.2 |
| 5,638,668 A * | 6/1997 | Kallevig et al. | ................ | 56/320.1 |
| 5,819,513 A * | 10/1998 | Braun et al. | ................ | 56/11.9 |
| 5,894,715 A * | 4/1999 | Braun et al. | ................ | 56/11.9 |
| 7,971,416 B2 * | 7/2011 | Hall et al. | ................ | 56/11.9 |
| 8,016,067 B2 * | 9/2011 | Horgas | ................ | 180/299 |
| 2003/0182915 A1 * | 10/2003 | Kobayashi et al. | ................ | 56/202 |
| 2009/0212185 A1 * | 8/2009 | Horgas | ................ | 248/298.1 |

FOREIGN PATENT DOCUMENTS
JP 4-041799 Y2 10/1992
* cited by examiner

*Primary Examiner* — Arpad Fabian-Kovacs
(74) *Attorney, Agent, or Firm* — Westerman, Hattori, Daniels & Adrian, LLP

(57) ABSTRACT

A walk-behind work machine in which vibration produced by the driving of an engine is not readily transmitted to an operating handle. The work machine includes a work-machine body having a plurality of mounting parts to which an engine is joined. The mounting parts include a high-rigidity mounting part positioned at a maximally rigid part on the work-machine body, and other mounting parts exclusive of the high-rigidity mounting part. The engine is joined securely to the other mounting parts and is joined more loosely to the high-rigidity mounting part than to the other mounting parts.

3 Claims, 5 Drawing Sheets

WALK BEHIND WORK MACHINE HAVING AN ENGINE MOUNTING STRUCTURE

FIELD OF THE INVENTION

The present invention relates to a walk-behind work machine on which an engine is mounted.

BACKGROUND OF THE INVENTION

Among walk-behind work machines on which an engine is mounted include those having an operating handle that extends rearwardly from a work-machine body. Lawnmowers and weed cutters are examples of this type of walk-behind work machine. Technology for such a walk-behind work machine is described in, e.g., Japanese Utility Model Publication No. H04-41799 (JP-U H04-41799 B).

The lawnmower described in JP-U H04-41799 B has an engine, a casing having a plurality of mounting parts for joining to the engine, and an operating handle extending to the rear from the casing. The engine is attached above the plurality of mounting parts using shock-absorbing rubber (a rubber mount).

Vibration resulting from the driving of the engine is transmitted to the casing and may then be transmitted from the casing to the operating handle. The vibration transmitted to the operating handle from the engine is preferably reduced in order to mitigate the strain on the operator. The rubber mount can be used to mitigate the vibration transmitted to the operating handle. However, the rubber may deteriorate as years pass, and the rubber must be replaced accordingly.

SUMMARY OF THE INVENTION

It is an object of the present invention to provide a walk-behind work machine in which vibration transmitted to an operating handle from an engine can be reduced without relying on anti-vibration rubber.

According to the present invention, there is provided a walk-behind work machine comprising: an engine; a work-machine body having a plurality of mounting parts to which the engine is joined; and an operating handle extending rearwardly from the work-machine body, wherein the plurality of the mounting parts includes a high-rigidity mounting part positioned at a maximally rigid part of the work-machine body, and other mounting parts exclusive of the high-rigidity mounting part, and the engine is joined securely to the other mounting parts and is joined more loosely to the high-rigidity mounting part than to the other mounting parts.

The high-rigidity mounting part that is positioned at the most rigid part on the work-machine body will tend to more readily transmit vibration from the engine than the other mounting parts. In response, the engine is loosely joined at the high-rigidity mounting part so that the motion of the engine in the direction in which the engine is joined will, to the greatest possible extent, not be restrained. Accordingly, it is possible to reduce to the greatest extent possible any vibration transmitted from the engine to the high-rigidity mounting part in the direction in which the engine is joined to the high-rigidity mounting part. Vibration transmitted to the operating handle from the engine can therefore be reduced without relying on anti-vibration rubber.

Preferably, the engine is joined to the plurality of the mounting parts by fastening of a bolt; and the high-rigidity mounting part comprises a restricting member for restricting the fastening of the engine using the bolt so that the engine is loosely joined. The fastening of the engine using the bolt can therefore be restricted by the restricting member.

Desirably, the operating handle is attached to the work-machine body with a stay interposed therebetween, an end part of a height-adjusting grip to be grasped by an operator for adjusting a height of the work-machine body above a ground surface is attached to the stay, an opposite end part of the height-adjusting grip is attached to the work-machine body, and the high-rigidity mounting part is positioned proximately to a part for attaching the opposite end part of the height-adjusting grip on the work-machine body.

In the present invention, it is noteworthy that the site and the vicinity thereof at which a large load acts from the height-adjusting grip when the height of the work-machine body is adjusted is the most rigid part on the work-machine body. The high-rigidity mounting part is thus disposed near the site for attaching the other end of the height-adjusting grip, i.e., on the site that is the most rigid [site on the walk-behind work machine], and it is therefore possible to reduce to the greatest extent possible any vibration transmitted from the engine to the high-rigidity mounting part in the direction in which the engine is joined to the high-rigidity mounting part.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

A lawnmower will be described as an example embodiment of a walk-behind work machine according to the present invention.

Figure 1:
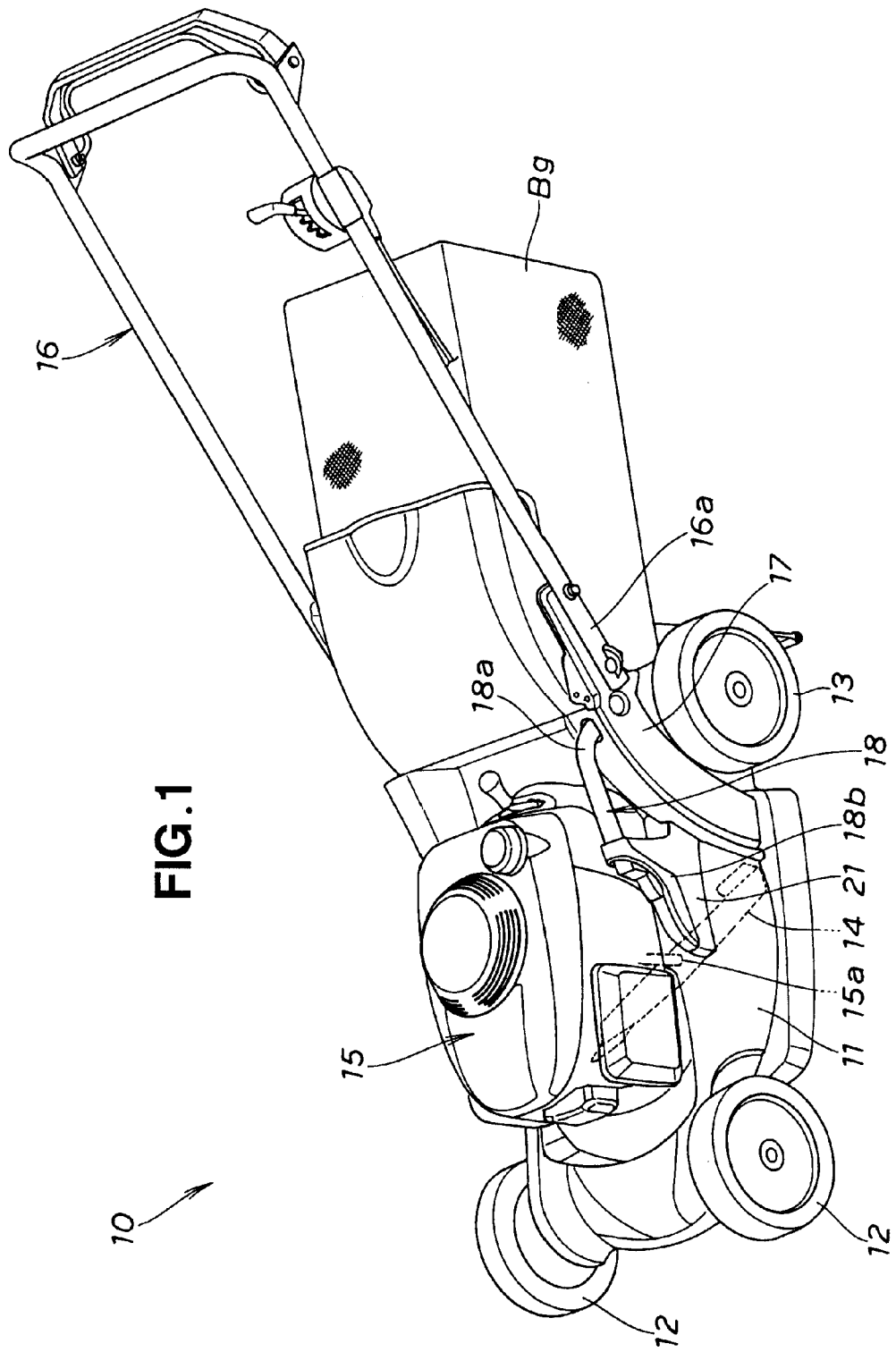
FIG. 1 is a perspective view of a walk-behind work machine according to the present invention.
Figure 2:
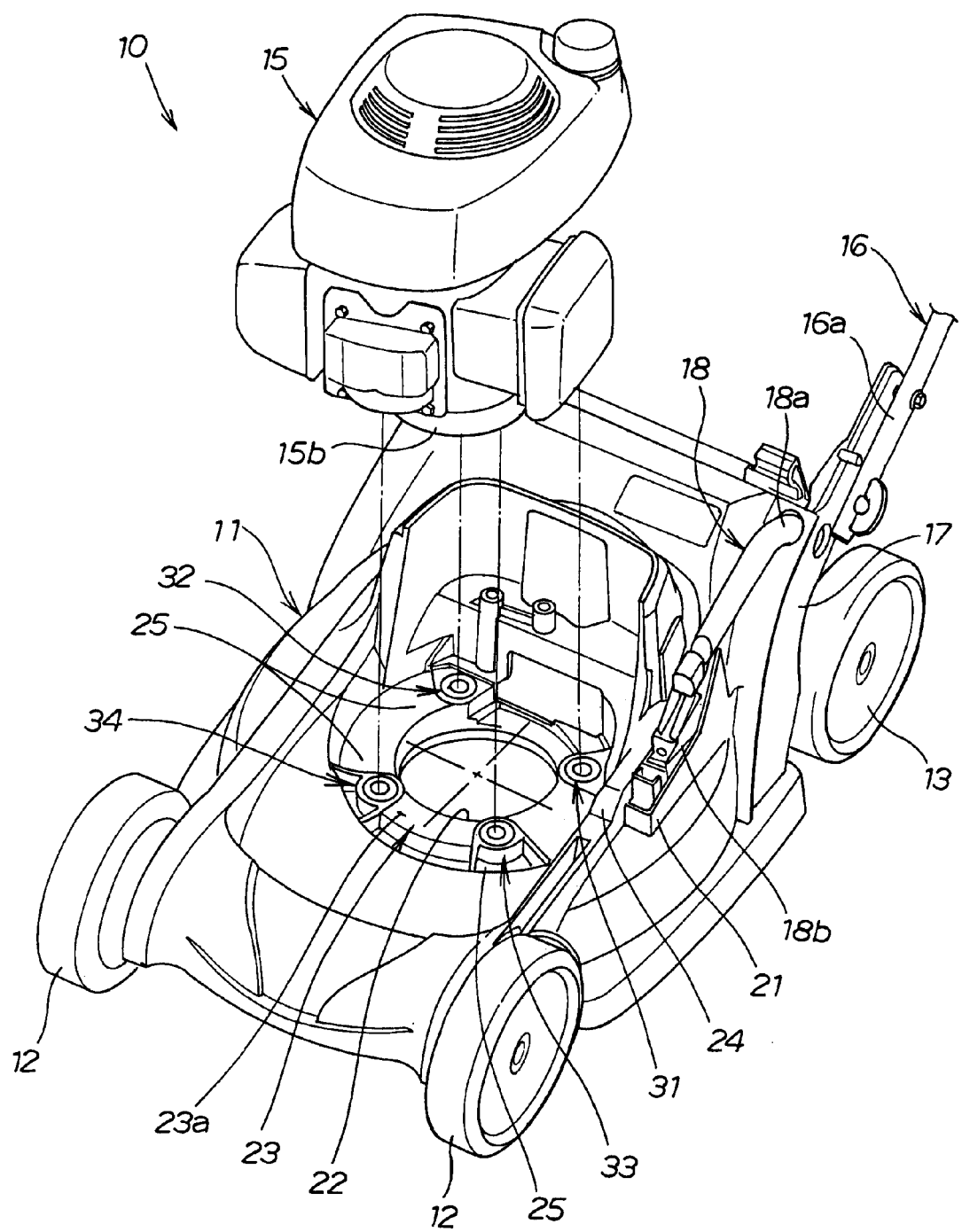
FIG. 2 is an exploded view showing a relationship between a housing, an engine, and an operating handle shown in FIG. 1.

As shown in FIGS. 1 and 2, a lawnmower 10 is a walk-behind self-propelled work machine for cutting grass, and is composed of a housing (work-machine body) 11 that is open at the bottom; left and right front wheels 12, 12 that are provided to the front part of the housing 11; left and right rear wheels 13, 13 that are provided to the rear part of the housing 11; a mowing blade 14 housed in the central interior part of the housing 11; an engine 15 provided to the upper part of the housing 11; and an operating handle 16 extending to the rear from the housing 11.

The housing 11 is composed of, e.g., a resin-molded article and also serves as a chassis. The engine 15 is laid over and bolted to the upper surface of the housing and thereby integrally assembled therewith. The engine 15 is a so-called vertical engine that has an output shaft 15a extending from a lower end [of the engine] into the housing 11 toward the lawn (not shown) below. The engine has an attachment flange 15b on the bottom end. The output shaft 15a is a driving shaft that is substantially perpendicular with respect to the lawn (ground).

The blade 14 is attached to the output shaft 15a within the housing 11. The blade 14 is driven by the engine 15, whereby the blade 14 rotates about the output shaft 15a within the housing 11. The engine 15 is used to drive the rear wheels 13, 13 via a variable speed drive (not shown), whereby the lawnmower 10 is propelled forward automatically, and lawn-mowing operations are continued.

In the lawnmower 10, the engine 15 causes the blade 14 to rotate, whereby grass is cut away, and airflow (swirl flow) is produced within the housing 11. The swirl flow causes the grass cut by the blade 14 to be carried into and stored in a cut-grass storage unit Bg.

Figure 3:
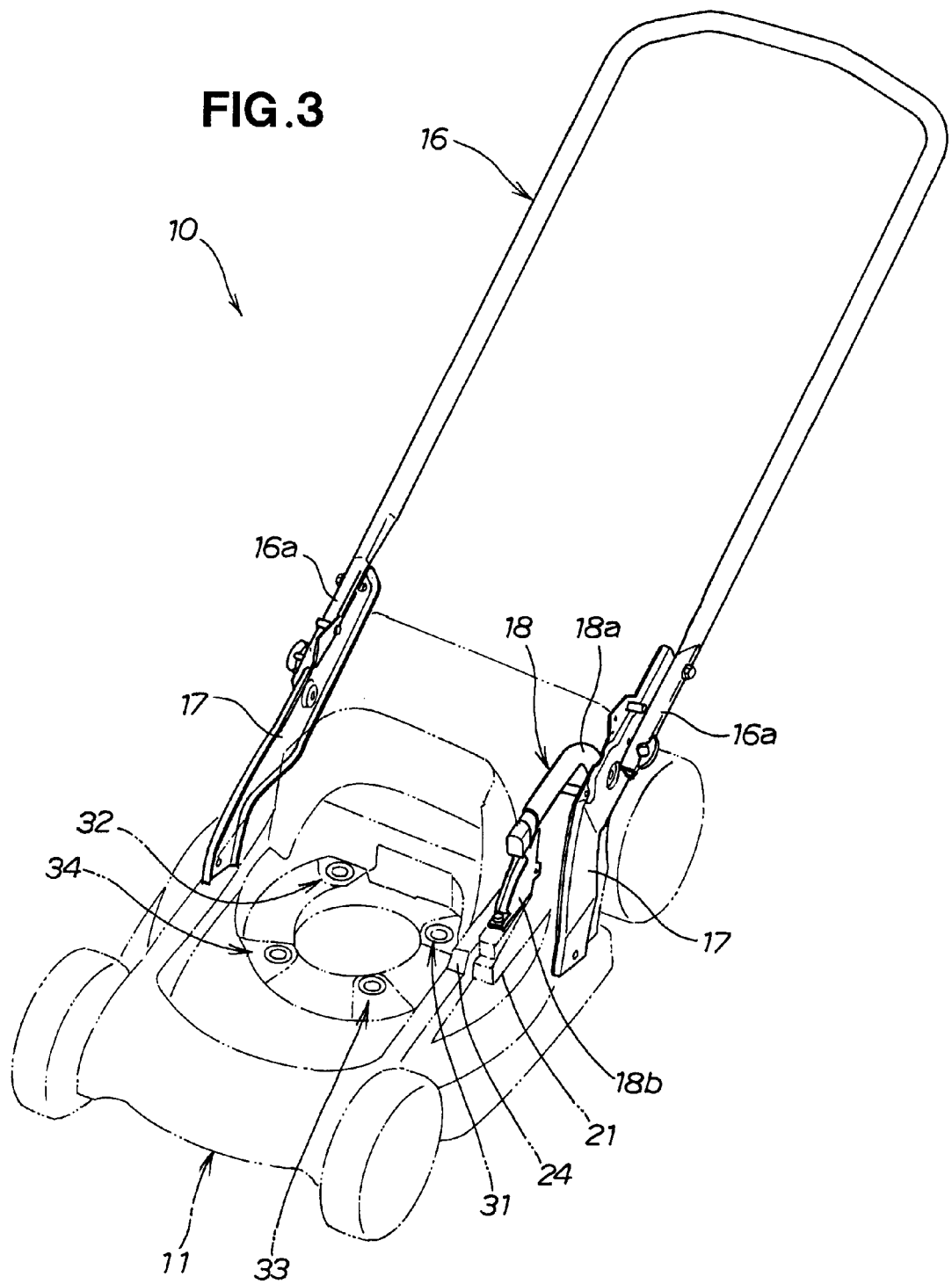
FIG. 3 is a perspective view of the operating handle, stays, and height-adjusting grip shown in FIG. 1.

The operating handle 16 is formed into a substantially inverted U-shape when the lawnmower 10 is viewed from the front, as shown in FIGS. 1 and 3. A pair of left and right proximal end parts 16a, 16a of the operating handle 16 is attached to the rear part of the housing 11 via respective stays 17, 17. The stays 17, 17 are bolted to the rear part of the housing 11. The operating handle 16 and the left and right stays 17, 17 are composed of steel, light metals, or another metal material.

The upper left part of the housing 11 is provided with a height-adjusting grip 18. The height-adjusting grip 18 is long and thin in the forward and backward direction in order to be grasped and raised or lowered by the operator when adjusting the height of the housing 11 above the ground. Adjusting the height of the housing 11 above the ground allows the mowing height of the blade 14 to be adjusted.

An end 18a of the height-adjusting grip 18 is attached to the stay 17. Another end 18b of the height-adjusting grip 18 is attached to a grip-attachment site 21 on the upper end of the housing 11. The grip-attachment site 21 is a portion that bulges upward from the upper surface of the housing 11. The portion having the bulging grip-attachment site 21 and the region around this portion are more rigid than other sites on the housing 11.

The attachment structure (mounting structure) of the engine 15 in relation to the housing 11 will be described in detail below. As shown in FIG. 2, the housing 11 is formed integrally with a through-hole 22, which passes vertically through the central upper surface, and an annular flange 23, which is positioned surrounding the through-hole 22. The output shaft 15a of the engine 15 is inserted from above through the through-hole 22. The upper surface of the flange 23 is formed in the shape of a flat, horizontal plate.

The housing 11 thus configured has on the flange 23 a plurality (four in this embodiment) of mounting parts 31 through 34 for joining to the engine 15. The four mounting parts 31 through 34 will be referred to as the first mount 31, the second mount 32, the third mount 33, and the fourth mount 34. In relation to the through-hole 22 when the housing 11 is viewed from above, the first mount 31 is positioned on the rear left, the second mount 32 is positioned on the rear right, the third mount 33 is positioned on the forward left, and the fourth mount 34 is positioned on the forward right.

The first mount 31 is positioned on a site 24 that is the most rigid part on the housing 11, i.e., on the high-rigidity site 24. The first mount is therefore appropriately called the "high-rigidity mounting part 31." The high-rigidity site 24 is positioned in the vicinity of the site 21 (grip-attachment site 21) for attaching the other end 18b of the height-adjusting grip 18 in the housing 11, as shown in FIGS. 2 and 3. In the present embodiment, it is noteworthy that the site 21 and the vicinity thereof at which a large load acts from the height-adjusting grip 18 when the height of the housing 11 is adjusted is the most rigid part on the housing 11. The high-rigidity mounting part 31 is thus disposed near the site 21 for attaching the other end 18b of the height-adjusting grip 18, i.e., on the site 24 that is the most rigid [site on the housing 11].

The second, third, and fourth mounts 32 through 34 are positioned on other sites 25, which are different from the site 24 that is the most rigid part on the housing 11. These mounts are therefore appropriately called the "other mounts 32 through 34."

Figure 4A:
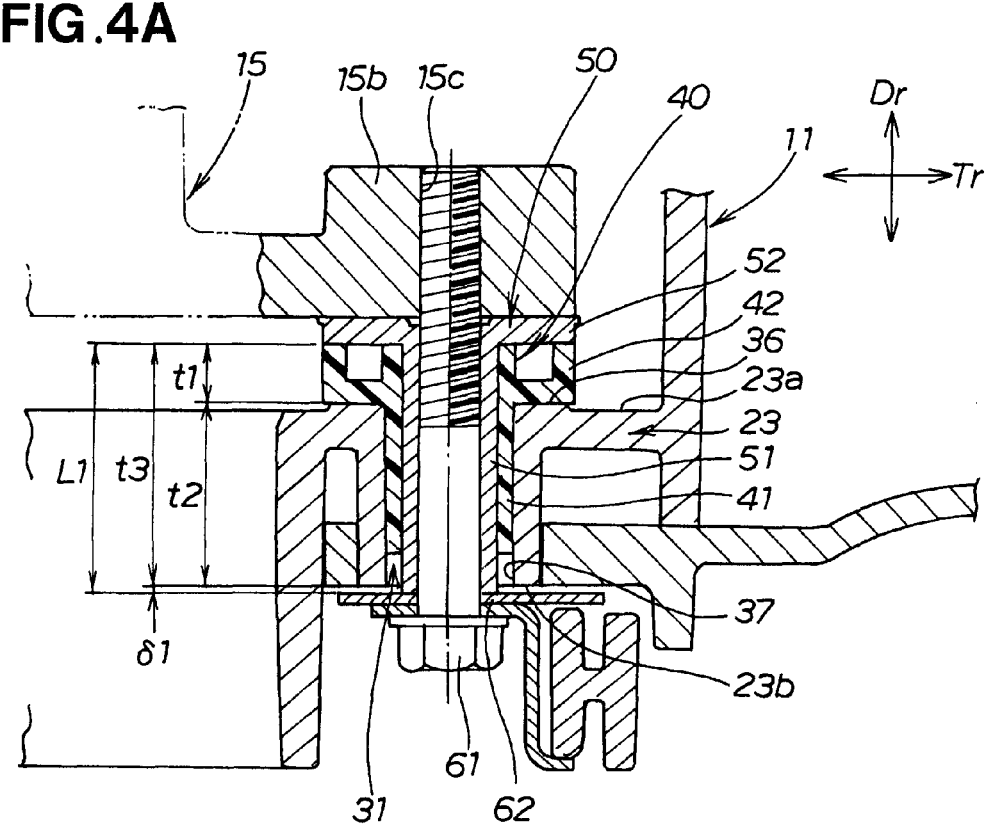
FIGS. 4A and 4B are views showing an arrangement of a rigid mounting part of FIG. 2.
Figure 4B:
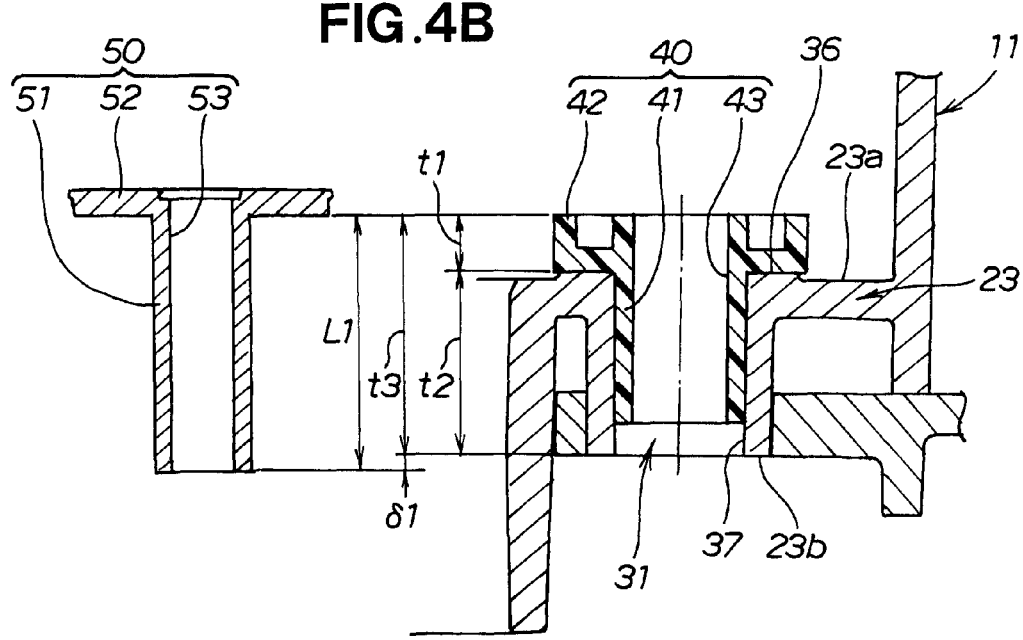

FIG. 4A shows the cross-sectional structure of the high-rigidity mounting part 31. FIG. 4B displays the high-rigidity mounting part 31 shown in FIG. 4A in a disassembled state. The high-rigidity mounting part 31 is composed of a seat surface 36 that is formed on a flange surface 23a (upper surface 23a) of the flange 23; and a through-hole 37 that is formed by passing vertically through the flange 23 at the position of the bearing surface 36. The through-hole 37 is a perfectly circular hole. The attachment flange 15b of the engine 15 is attached to the high-rigidity mounting part 31 by a bolt 61 interposed between a heat insulator 40 and a collar 50.

The heat insulator 40 is an integrally molded article composed of a cylindrical part 41 and a flange 42, and configured from a heat-insulating material. The heat-insulating material can block heat transmitted from the engine 15 to the housing 11 and has a higher degree of hardness (lower elasticity) than typical anti-vibration rubber. The cylindrical part 41 is fitted into the through-hole 37 of the high-rigidity mounting part 31. The flange 42 is shaped as a circular plate that is continuous with one end of the cylindrical part 41. The thickness of the flange is t1. The flange 42 overlays the bearing surface 36 when the cylindrical part 41 is fitted into the through-hole 37. The length of the cylindrical part 41, i.e., the length from the distal end of the cylindrical part 41 to the back surface of the flange 42 (the so-called "length under flange") is less than a thickness t2 of the flange 23 of the high-rigidity mounting part 31 (the thickness t2 from the bearing surface 36 to a back surface 23b of the flange 23).

The collar 50 is an integrally molded article composed of a cylindrical part 51 and a flange 52, and is configured from, e.g., steel or another metal material. The cylindrical part 51 is fitted into the cylindrical part 41 of the heat insulator 40, i.e., into a through-hole 43. The flange 52 has a circular-plate shape that is continuous with one end of the cylindrical part 51. The flange 52 overlays the flange 42 of the heat insulator 40 when the cylindrical part 51 of the collar 50 is fit into the through-hole 43 of the heat insulator 40. The length of the cylindrical part 51 of the collar 50, i.e., the length from the distal end of the cylindrical part 51 to the back surface of the flange 52 (the so-called "length under flange") is L1.

A value t3 resulting from adding the thickness t1 of the flange 42 of the heat insulator 40 to the thickness t2 of the flange 23 of the high-rigidity mounting part 31 will be referred to as the sum thickness t3 of the high-rigidity mounting part 31 (t3=t1+t2). The length L1 of the cylindrical part 51 of the collar 50 is set to be slightly larger than the sum thickness t3 of the high-rigidity mounting part 31 by a fixed length δ1 that is set in advance (t3+δ1=L1).

The attachment flange 15b of the engine 15 is laid on the flanges 42, 52 that overlay the bearing surface 36 of the high-rigidity mounting part 31 and is attached by the bolt 61 that passes within the cylindrical part 51 of the collar 50, i.e., in a through-hole 53. The tolerance for fitting the cylindrical part 41 of the heat insulator 40 in the through-hole 37 of the high-rigidity mounting part 31, the tolerance for fitting the cylindrical part 51 of the collar 50 into the through-hole 43 of the cylindrical part 41 of the heat insulator 40, and the tolerance for fitting the bolt 61 into the through-hole 53 of the cylindrical part 51 of the collar 50 are all set so that substantially no gaps are present when fit.

The engine 15 is attached to the high-rigidity mounting part 31, e.g., as follows.

The cylindrical part 41 of the heat insulator 40 is first inserted into the through-hole 37 of the high-rigidity mounting part 31 from the direction of the bearing surface 36, as shown in FIG. 4B.

The cylindrical part 51 of the collar 50 is then inserted into the through-hole 43 of the heat insulator 40 from the direction of the bearing surface 36.

The attachment flange 15b of the engine 15 is then positioned to overlay the flanges 42, 52 that overlay the bearing surface 36 of the high-rigidity mounting part 31.

The bolt 61, which has a washer 62, is then inserted into the through-hole 53 of the collar 50 from the direction of the back surface 23b of the flange 23 and is screwed into the a screw hole 15c of the attachment flange 15b of the engine 15. The attachment operation is then complete.

Fastening the bolt 61 thus joins the engine 15 to the high-rigidity mounting part 31. The length L1 of the cylindrical part 51 of the collar 50 is longer than the sum thickness t3 of the high-rigidity mounting part 31, and the engine 15 is therefore loosely joined to the high-rigidity mounting part 31. As is made clear from descriptions above, the collar 50, and in particular the cylindrical part 51, fulfils the role of a "restricting member" for restricting the fastening of the engine 15 using the bolt 61. The high-rigidity mounting part 31 is [thus] provided with the restricting member 50 (collar 50).

Figure 5A:
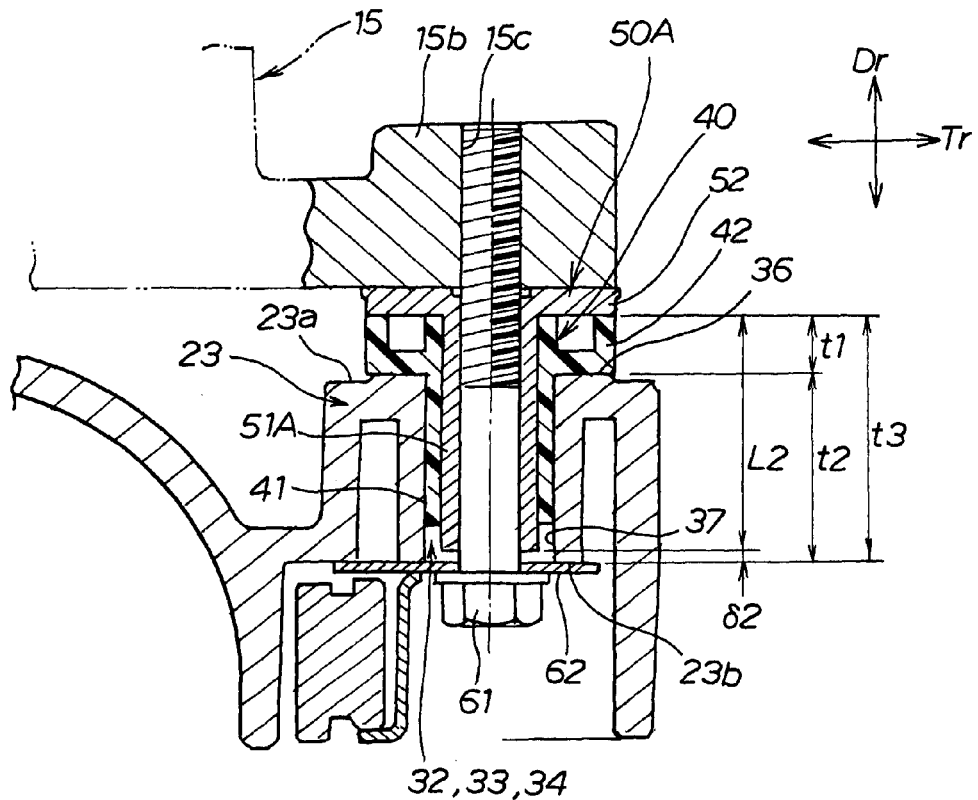
FIGS. 5A and 5B are views showing other mounting parts of FIG. 2.
Figure 5B:
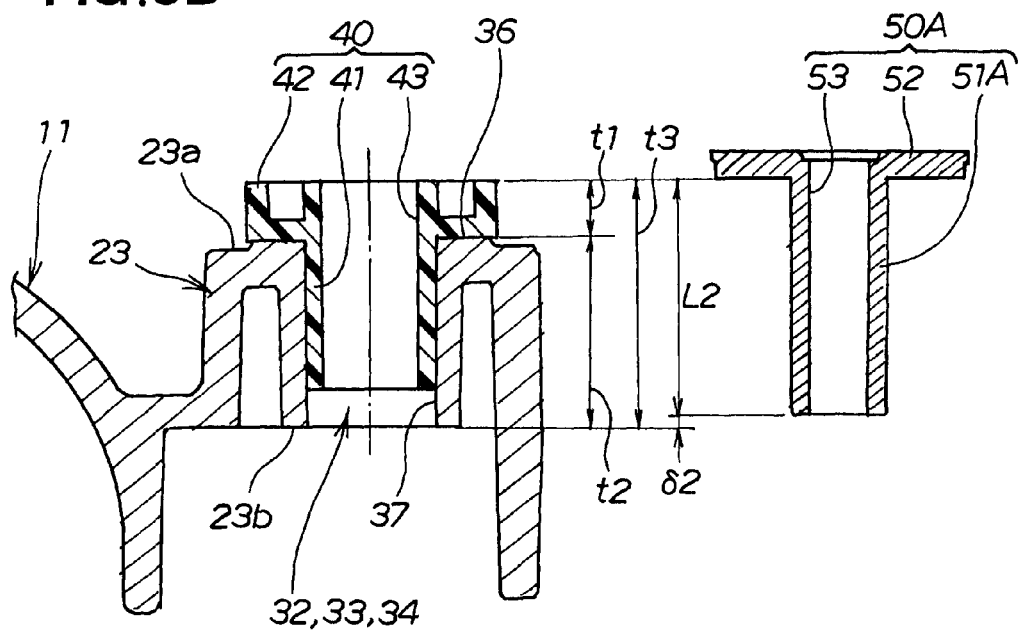

FIG. 5A shows the cross-sectional structure of the other mounting parts 32 through 34. FIG. 5B displays the other mounting parts 32 through 34 shown in FIG. 5A in a disassembled state.

The structure for attaching (mounting) the engine 15 with respect to the other mounting parts 32 through 34 is characterized by a length L2 of a collar 50A. The rest of the configuration is substantially identical to the structure for attaching the engine 15 with respect to the high-rigidity mounting part 31 shown in the aforedescribed FIGS. 4A and (b) of 4B. The same notation will therefore be applied, and descriptions thereof will be omitted.

The collar 50A has the same basic configuration as the collar 50 shown in FIGS. 4A and 4B. The length of a cylindrical part 51A of the collar 50A, i.e., the length from the distal end of the cylindrical part 51A to the back surface of the flange 52, is L2. The thicknesses t1, t2, t3 of the respective sites on the other mounting parts 32 through 34 are the same as the thicknesses of the corresponding sites in the high-rigidity mounting part 31. In other words, the sum thicknesses t3 in the respective other mounting parts 32 through 34 are expressed by t3=t1+t2. The length L2 of the cylindrical part 51A of the collar 50A is set to be slightly smaller than the sum thickness t3 by a fixed length 62 that is set in advance (t3−δ2=L2).

Fastening of the bolts 61 thus joins the engine 15 to the other mounting parts 32 through 34. The length L2 of the cylindrical part 51A of the collar 50A is shorter than the sum thickness t3 of the mounting parts 32 through 34, and the engine 15 is therefore securely joined to the other mounting parts 32 through 34.

The operation of the structure for attaching the engine 15 to the housing 11 of the aforedescribed configuration will now be described with reference to FIGS. 4A and 5A. In general, the high-rigidity mounting part 31 that is positioned at the most rigid part on the housing 11 will tend to more readily transmit vibration from the engine 15 to the housing 11 than the other mounting parts 32 through 34.

In contrast, in the present embodiment, changing (i.e., adjusting) the length L1 of the collar 50 in the high-rigidity mounting part 31 and the length L2 of the collar 50A in the other mounting parts 32 through 34 results in a configuration in which vibration transmission is limited. Specifically, as shown in FIG. 4A, the length L1 of the collar 50 is made larger, whereby the engine 15 is attached more loosely with respect to the high-rigidity mounting part 31, which is positioned at the most rigid part on the housing 11, than with respect to the mounting parts 32 through 34. In other words, the joining is similar to a floating mount. The fastening of the bolt 61 therefore allows the force for joining the engine 15 to the high-rigidity mounting part 31 to be restricted by the collar 50.

In other words, the parts are loosely joined, i.e., the mount-joining rigidity is reduced so that the motion of the engine 15 in the direction in which the engine 15 is joined at the high-rigidity mounting part 31 (the direction of the arrow Dr in FIG. 4A), i.e., the direction for fastening using the bolt 61, will, to the greatest possible extent, not be restrained. Accordingly, it is possible to reduce to the greatest extent possible any vibration transmitted from the engine 15 to the high-rigidity mounting part 31 in the direction in which the engine 15 is joined to the high-rigidity mounting part 31 (the direction of the arrow Dr). Vibration transmitted to the operating handle 16 (see FIG. 1) from the engine 15 can therefore be reduced without relying on anti-vibration rubber. Adjusting the length of the cylindrical part 41 of the heat insulator 40 allows this result to be achieved.

In particular, (1) vibration modes (e.g., the frequency and magnitude of a vibration) that are transmitted from the engine 15 via the high-rigidity mounting part 31 and the housing 11 to the operating handle 16 and (2) vibration modes that are transmitted from the engine 15 via the other mounting parts 32 through 34 and the housing 11 to the operating handle 16 can be made substantially equivalent. Vibration modes transmitted, e.g., from the housing 11 to the left and right proximal end parts 16a, 16a of the operating handle 16 can be made substantially equivalent. The operator grasping the operating handle 16 with both hands is not subjected to vibration occurring predominantly on either the left or right side. Therefore, the work environment of the walk-behind work machine 10 is improved, and the burden on the operator is mitigated.

Merely adjusting the lengths L1, L2 of the cylindrical parts 51, 51A of the collars 50, 50A or the length of the cylindrical part 41 of the heat insulator 40 thus allows transmitted vibration to be reduced. According to the experimental results of the present inventors, the vibration level of the operating handle 16 when vibration produced by the engine 15 was transmitted via the housing 11 to the operating handle 16 was reduced by approximately two-thirds over that of the prior art.

A simple configuration in which the restricting member (the collars 50, 50A or the heat insulator 40) is merely provided to the high-rigidity mounting part 31 allows the fastening of the engine 15 by the bolt 61 to be restricted.

The tolerance for fitting the cylindrical part 41 into the through-hole 37, the tolerance for fitting the cylindrical part 51 into the through-hole 43, and the tolerance for fitting the bolt 61 into the through-hole 53 are all set so that substantially no gaps will be present. The amount of relative displacement of the heat insulator 40, the collars 50, 50A, and the bolt 61 in the radial direction of the through-hole 37 is therefore extremely small. The high-rigidity mounting part 31 can adequately support loads in the rotational direction of the engine 15 (the direction of the arrow Tr in FIG. 4A).

In the high-rigidity mounting part 31, the transmission of vibration in the direction in which the engine 15 is joined (the direction of the arrow Dr) can thus be reduced to the utmost possible extent, and loads in the rotational direction of the engine 15 (the direction of the arrow Tr) can be supported.

The heat insulator 40 is optionally included in the present invention. When the heat insulator 40 is not provided, the cylindrical parts 51, 51A of the collars 50, 50A are fitted into the through-hole 37, and the flange 52 of the collars 50, 50A overlays the bearing surface 36. The sum thickness t3 in such instances is the same as the thickness t2 of the flange 23 (t3=t2). Even in such instances, the length L1 of the cylindrical part 51 is set to be larger than the sum thickness t3 by the length 61, and the length L2 of the cylindrical part 51A is set to be smaller than the sum thickness t3 by the length 62.

The flange 52 is optionally provided to the collars 50, 50A. In other words, the collars 50, 50A may comprise the cylindrical parts 51, 51A alone.

The walk-behind work machine of the present invention is ideally applied to rotary lawnmowers.

Obviously, various minor changes and modifications of the present invention are possible in light of the above teaching. It is therefore to be understood that within the scope of the appended claims the invention may be practiced otherwise than as specifically described.

What is claimed is:

1. A walk-behind work machine; comprising:
an engine;
a work-machine body having a plurality of mounting parts to which the engine is joined; and
an operating handle extending rearwardly from the work-machine body,
wherein the plurality of mounting parts includes a high-rigidity mounting part, having a hole therein, positioned at a maximally rigid part on the work-machine body, and other mounting parts exclusive of the high-rigidity mounting part, and
further wherein the high-rigidity mounting part includes,
a cylindrical heat insulator, disposed inside of said hole, and having a flange on an upper portion thereof, and
a collar having a flange on an upper portion thereof, and being disposed inside of said heat insulator, such that the flange of said collar is positioned above the flange of said heat insulator, and further such that a first length, between a bottom of the flange of the collar and a lower end of the collar, is larger than a second length, from a top of the flange of the heat insulator to a lower end, opposite the flange, of the heat insulator, in order to form a gap which is a difference between the first and second lengths, and wherein
the engine is joined securely to the other mounting parts and is joined more loosely to the high-rigidity mounting part than to the other mounting parts.

2. The work machine according to claim 1, wherein the engine is joined to the mounting parts by fastening of a bolt.

3. The work machine according to claim 1, wherein the operating handle is attached to the work-machine body via a stay interposed therebetween, an end part of a height-adjusting grip to be grasped by an operator for adjusting a height of the work-machine body above a ground surface is attached to the stay, an opposite end part of the height-adjusting grip is attached to the work-machine body, and the high-rigidity mounting part is positioned proximately to a portion for attaching the opposite end part of the height-adjusting grip on the work-machine body.

* * * * *